(12) United States Patent
Bozeman

(10) Patent No.: US 6,754,640 B2
(45) Date of Patent: Jun. 22, 2004

(54) UNIVERSAL POSITIVE PAY MATCH, AUTHENTICATION, AUTHORIZATION, SETTLEMENT AND CLEARING SYSTEM

(76) Inventor: William O. Bozeman, 8022 Stimie Ave. N., St. Petersburg, FL (US) 33710

( * ) Notice: Subject to any disclaimer, the term of this patent is extended or adjusted under 35 U.S.C. 154(b) by 0 days.

(21) Appl. No.: 09/983,065

(22) Filed: Oct. 23, 2001

(65) Prior Publication Data

US 2002/0052852 A1 May 2, 2002

Related U.S. Application Data

(60) Provisional application No. 60/243,722, filed on Oct. 30, 2000.

(51) Int. Cl.[7] .............................................. G06F 17/60
(52) U.S. Cl. ................................ 705/40; 705/1; 705/55
(58) Field of Search ........................................ 705/40, 1

(56) References Cited

U.S. PATENT DOCUMENTS

| | | | |
|---|---|---|---|
| 4,109,238 A | | 8/1978 | Creekmore ............. 340/149 A |
| 5,237,620 A | * | 8/1993 | Deaton et al. ................. 705/10 |
| 5,586,222 A | * | 12/1996 | Zhang et al. .................. 706/18 |
| 5,677,955 A | * | 10/1997 | Doggett et al. ................ 705/76 |
| 5,801,366 A | | 9/1998 | Funk et al. .................. 235/380 |
| 6,036,344 A | | 3/2000 | Goldenberg ................ 364/408 |
| 6,213,391 B1 | * | 4/2001 | Lewis ......................... 235/380 |

FOREIGN PATENT DOCUMENTS

| | | | | |
|---|---|---|---|---|
| WO | WO 97/05583 A1 | * | 2/1997 | ............. G07F/7/10 |
| WO | WO 97/36267 | * | 10/1997 | ............. G07F/7/10 |

OTHER PUBLICATIONS

State of Utah: Uniform Accounting Manual. Apr. 1, 1997. http://www.uam.sao.state.ut.us/county/iif04.htm [online]. Retrived Sept. 1, 2002.*

* cited by examiner

Primary Examiner—James P. Trammell
Assistant Examiner—James A. Reagan
(74) Attorney, Agent, or Firm—Richard C. Litman

(57) ABSTRACT

An universal positive pay match, authentication, authorization, clearing and settlement system to reduce check and card fraud. The system includes several technologies for inputting check register information connectively from various users of the system, a database for storing the check register information and the check histories, software that searches for and captures escheated check register information, software that automatically polls check register information from the customer, the customer's bank or merchant and conducting and transmitting a partial or full reconciliation of the check register information from the system to the customer. Also included in the system is the ability of the customer's bank to provide either a stalled debit or debit stall to the customer.

26 Claims, 15 Drawing Sheets

UNIVERSAL POSITIVE PAY MATCH, AUTHENTICATION, AUTHORIZATION, SETTLEMENT AND CLEARING SYSTEM

CROSS-REFERENCE TO RELATED APPLICATION

This application claims the benefit of U.S. Provisional Patent Application Serial No. 60/243,722, filed Oct. 30, 2000.

BACKGROUND OF THE INVENTION

1. Field of the Invention

The present invention relates to a universal positive pay match, authentication, authorization clearing and settlement system to reduce check fraud and verify checks, other financial instruments and documents.

2. Description of Related Art

Check fraud and verification of checks presented to merchants and financial institutions have always been a problem for payers who write checks. Additionally, merchants and other payees are also concerned about check fraud, as well as banks and clearing houses. According to the Chairman of the Federal Reserve, Allan Greenspan, nearly 70 billion checks were written in 1999, with check fraud being approximately $15 billion dollars during that same year.

U.S. Pat. No. 4,109,238 issued to Creekmore, outlines the use of a check verification system for providing customer operated verification of checks at point of sale locations. The system enables a customer to verify several possible kinds of checking functions, including verification of payroll or government checks as well as certain types of personal checks for cash. The system utilizes a number of local point of use terminals which are operated by the customer and which communicate with a remotely located transaction processor, including a positive file of customers who are entitled to verify checks.

U.S. Pat. No. 5,801,366 issued to Funk et al., outlines the use of an automated check processing system which includes an input device receiving checking account information and a check amount of a check provided for payment in a transaction. A transaction database coupled to the input device then electronically receives and stores the checking account information and check amount, which are then downloaded to a power encoder. The power encoder receives checking account information and check amounts for transactions occurring over a predetermined transaction period and then matches the checks with the electronic checking account information and check amounts.

U.S. Pat. No. 5,677,955 issued to Doggett et al. outlines the use of an electronic instrument created in a computer-based method for effecting a transfer of funds from an account of a payor in a funds-holding institution to a payee. The electronic instrument includes an electronic signature of the payor, digital representations of payment instructions, the identity of the payor, the identity of the payee and the identity of the funds-holding institution. A digital representation of a verifiable certificate by the institution of the authenticity of the instrument of the instrument is appended to the instrument.

U.S. Pat. No. 6,036,344 issued to Goldenberg outlines the use of an apparatus and method for countering fraudulent check cashing schemes that includes a central processing center that is connected to a plurality of banks through secure communication channels. Each check drawn against the banks has information stored therein, with that information corresponding to a plurality of digits and characters for the central processing center. When a check is presented at a bank, the information on the check is sent through one of the secure communication channels to the central processing system, which determines whether or not the account has sufficient funds to allow the check to be drawn against the account.

World Pat. No. WO 97/36267 also granted to Funk, outlines the use of an automated positive check authorization system that includes an input device for receiving a check amount and checking account information pre-printed on a check drawing on a checking account presented in a transaction at the time of check presentment. The checking account information and check amount are electronically transmitted to a check verifier, which receives the check amount and checking account information from the input device and searches a checking account database for a current balance in the checking account.

This kind of "bank specific" positive pay check authorization system is known to those schooled in the related art, but is very limited in its application. Therefore, there is a need for a positive pay match, authentication, authorization, clearing and settlement system which could be universally applied in order to result in a more secure authorization system.

None of the above inventions and patents, taken either singly or in combination, is seen to describe the instant invention as claimed.

SUMMARY OF THE INVENTION

The invention is a Universal Positive Pay match, authentication, authorization, clearing and settlement system by Ramboze Inc., to reduce check fraud. The system includes several technologies for inputting check register information connectively from various users of the system, a database for storing the check register information and the check histories, software that searches for and captures check register information for compliance with escheat laws, software that automatically polls check register information from the customer or the customer's bank, and software for conducting and transmitting a partial or full reconciliation of the check register information from the system to the customer.

Accordingly, it is a principal object of the invention to provide a universal positive pay match, authentication, authorization, clearing and settlement system that reduces check fraud and maintains check payment control.

It is another object of the invention to provide a universal positive pay match, authentication, authorization, clearing and settlement system that can interchangeably be used by customers, financial institutions, commercial retail entities, the Federal Reserve, check verification services, insurance companies, pharmaceutical companies and other entities.

It is a further object of the invention to provide a universal positive pay match, authentication, authorization, clearing and settlement system that also provides a positive or negative check history rating on a customer.

It is a further object of the invention to utilize a wide variety of technology to input data into the universal positive pay match, authentication, authorization, clearing and settlement system.

It is a further object of the invention to perform a point of sale, point of presentment and point of encashment check authorization.

It is a further object of the invention to utilize electronic checks with the universal positive pay match, authentication, clearing and settlement authorization system.

It is a further object of the invention to allow a paper check conversion to an electronic check or an electronic check conversion to a paper check on a magnetic ink character recognition laser printer utilizing the check registration information for the universal positive pay match, authentication, authorization, clearing and settlement system.

It is a further object of the invention to apply security detectable inks, tamper-proof foils and threads, as well as holograms to a financial instrument used in the universal positive pay match, authentication, authorization, clearing and settlement system to provide additional security against fraud.

It is a further object of the invention to provide new wireless devices, known as the cell wallet, the palm wallet, the e-wallet and the cam wallet, to be used with the universal positive pay match, authentication, authorization, clearing and settlement system.

It is a further object of the invention to utilize a wide variety of plastic card financial instruments such as credit cards, debit cards, stored value cards, payroll cards, cash cards and smart cards to input check registration information into the universal positive pay match, authentication, authorization, clearing and settlement system.

It is a further object of the invention to provide a service for bill presentment, bill payment, accounts payable and payroll using the universal positive pay match, authentication, authorization, clearing and settlement system.

It is a further object of the invention to utilize a check with a micro computer chip embedded within the paper surface of the check, to contain digitized signatures, security, GPS locate and check registration information.

It is a further object of the invention to reduce the amount of paper and plastic involved with conducting banking transactions.

It is a further object of the invention to provide a positive match of data exchange for insurance policies, medical information and pharmaceutical information.

It is an object of the invention to provide improved elements and arrangements thereof in an apparatus for the purposes described which is inexpensive, dependable and fully effective in accomplishing its intended purposes.

It is an object of the invention to provide the financial institution merchant and all parties to debit stall or stall debit on any and all debit card and check debit transactions.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
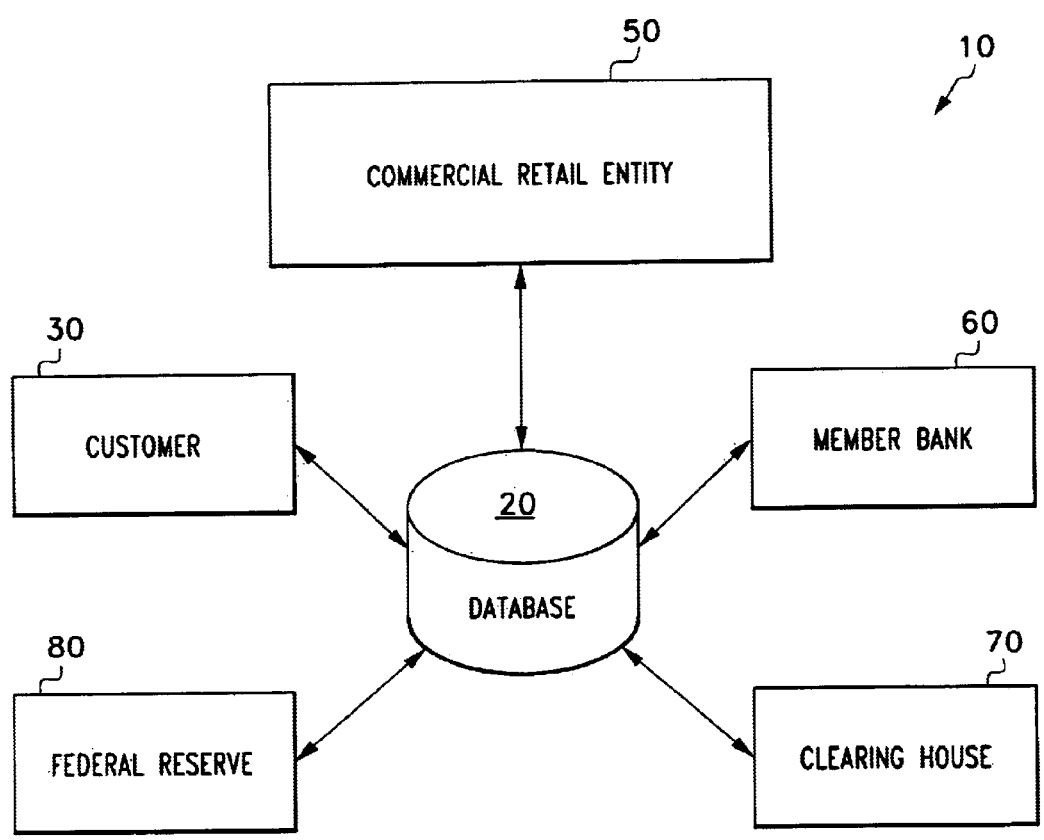
FIG. 1 is a diagram of parties involved with an Internet and land based central data bank universal positive pay match, authentication, authorization, clearing and settlement system according to the present invention.

The present invention is a universal positive pay match, authentication, authorization, clearing and settlement system 10 for maintaining check payment control and preventing check fraud with connectivity between all users, as shown in FIG. 1.

The invention comprises at least one server computer having a processor, an area of main memory for executing program code under the direction of the processor, a storage device for storing data and program code and a bus connecting the processor, area of main memory and the storage device.

There is one database 20 stored on the storage device, as well as a data communications device, such as a modem, connected to the bus for connecting a server computer to the Internet and land based. There is web-based computer program code stored in the storage device and executing in the main memory under the direction of the processor.

The computer program includes a software means for searching and capturing check register information for compliance with escheat laws, a software means for automatically polling check register information, a means for transmitting a partial or full reconciliation of the check register information, a software means for locating lost, stolen, misplaced items and items not presented and that remain outstanding and a means for archiving and storing check register, matching data, verification data and authentication data for up to a period of seven years.

Positive pay services have been available from individual banks for a number of years. It is a service that a bank sells for a fee to its account holders whereby only checks that are pre-approved are accepted at the bank. The check generating customer generally uploads a file of check register information daily to the bank of all checks written that day. When checks drawn on the customers' accounts are presented to the bank, their database is queried. If the check has been tampered with or if it is an unauthorized check number, the check will be rejected.

Positive pay services are recognized as an effective service to fight against check fraud. Rejected checks cause considerable effort to be expended throughout the highly regulated banking system. A typical check passes from point of sale to depositing bank to the Federal Reserve or clearing bank and back to the account holder's bank and account. At each step, the check is read, sorted and recorded, forming a trail that can be easily traced.

The existing positive pay services are bank specific. In other words, only a bank's own account holders can utilize it and take advantage of it. The preferred embodiment of this system is a universal positive pay check authorization service that can be used by both account holder members and non-members. The universal positive pay match, authentication, authorization, clearing and settlement system 10 will be accessed by all banks, depositors and account holders for issuing and tracking check data, signatures and matrixes at point of presentment, point of sale and point of payment of the item.

The universal positive pay match, authentication, authorization, clearing and settlement system 10 allows all banks to participate in a process that would catch fraudulent checks earlier in the check redemption cycle. At each step in the check clearing process, the database 20 of the universal positive pay match, authentication, authorization, clearing and settlement system 10 can be queried to determine if the owner of the account has indeed authorized the instrument for the amount written and signature on the instrument. A few banks have already developed their own internal positive pay software, however, this software is only bank specific.

The universal positive pay match, authentication, authorization, clearing and settlement system 10 utilizes current check register information that includes a check number, a check amount, an account number, a routing number, a check date, signatures, digitized signatures and matrixes and a check payee. The identity of the drawee-payor bank may be derived from the routing number. The check register information is not limited to written check information and can include other financial instruments such as electronic checks, cash cards, credit cards, traveler's checks, money orders, gift certificates and cashier's checks. Although the customer (depositor) 30 will mostly use the universal positive pay match, authentication, authorization, clearing and settlement system 10 for written checks, because of the similarity of check register information between these financial instruments, the universal positive pay match, authentication, authorization, clearing and settlement system 10 can easily accommodate the check register information for other financial instruments as well.

For a customer 30, the universal positive pay match, authentication, authorization, clearing and settlement system 10 has the flexibility to utilize several means for inputting current check register information. These include computerized devices such as personal computers, portable laptops and palmtops, as well as mainframe computers and servers, all of which can be tied into the Internet and land based data bank.

The customer 30 can simply log onto the uniform resource locator of the Web site of the database 20 and can then fill out a customized Web form to upload current check register information to the Web site by hypertext transfer protocol (HTTP) or by e-mail. These types of forms are well-known to those schooled in the related art, as is the use of the Internet protocols to transmit forms information on the Internet.

Alternatively, the customer 30 can initially set up an account number and enter an activation code or a preset encrypted code so that check register information can be transmitted to the database 20 and Web site by keying in the information by touchtone telephone, so that conventional decoder machines link the information to the database. A wireless telephony device can be used in the same manner, with either audible or subaudible tones corresponding to the keys pressed being modulated onto the radio frequency carrier, and then being demodulated on reception and linked to the database. Another alternative uses voice recognition software to encode information received by telephone to enter check register information to the database 20. Use of these telephony devices, voice recognition software and systems are well-known to those skilled in the related art and are not a point of novelty with this invention.

Additionally, technology such as optical character recognition devices and magnetic ink character recognition devices can also be used as a means for inputting current check register information from the customer 30. The magnetic ink character recognition devices and digital readers can also be used by commercial check generating entities at the point of presentment and point of encashment to read check register information off of a written check, allowing matching, authenticated, authorization, clearing and settlement.

Other means for inputting current check register information include transmitting the information by modem using direct dial software without going through a computer network, by facsimile transmission, or by mail. These means for inputting check register information, however, typically are not as convenient and popular as using the Internet and existing, account clearing houses 70, credit cards or other financial communications networks.

A participating commercial entity, such as a commercial retail store 50, member bank 60, clearing house 70 and Federal Reserve 80 may match and compare the information from the check with the check register information in the universal positive pay match, authentication, authorization, clearing and settlement system 10. Hence, a collecting bank intermediate the presenting bank and the payor bank may validate the check by comparing the check register information recorded in the database 20 against the entries on the check to verify that the check has not been altered or tampered with. This is typically done by logging onto the universal positive pay match, authentication, authorization, clearing and settlement system's 10 Web site over the Internet and simply accessing the desired current check register information file in the database 20.

If the check has been altered in any way, the participating commercial entity is immediately notified not to accept the altered check. Likewise, a customer 30 can instantly check the universal positive pay match, authentication, authorization, clearing and settlement system 10 for either a perfect match or a rejection of the check. A clearing house 70 or Federal Reserve Clearing Division 80 can also instantly check the universal positive pay match, authentication, authorization, clearing and settlement system 10 or reject an altered check based on the current check register information.

The universal positive pay match, authentication, authorization, clearing and settlement system 10 also has the means for performing a partial or full real-time reconciliation of the check register information for a customer 30 on a daily or weekly basis, depending on the needs of the customer 30. The reconciliation for the customer 30 is requested and transferred via the Internet from the universal positive pay match, authentication, authorization, clearing and settlement system 10.

Figure 2:
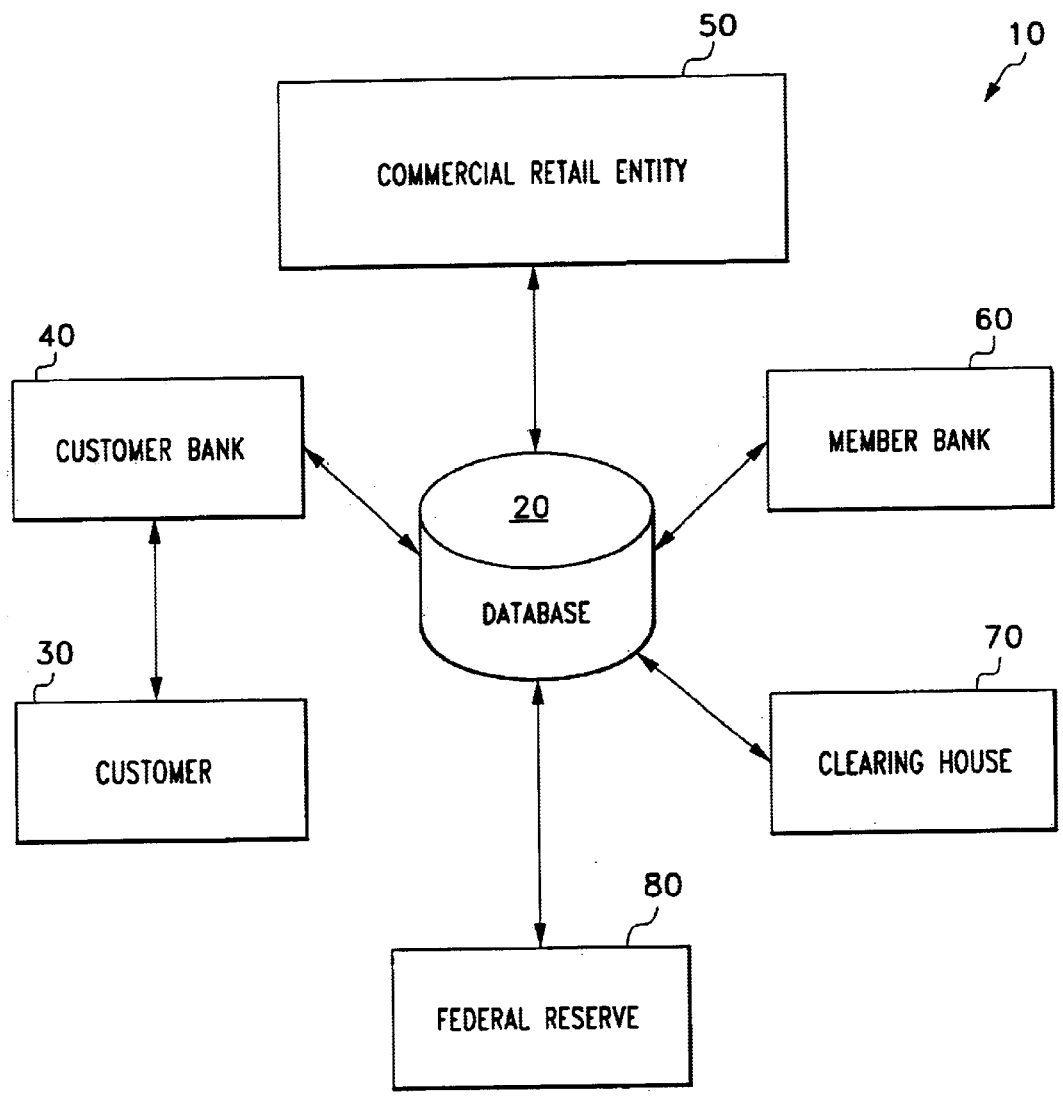
FIG. 2 is a diagram of parties involved with an Internet and land based central data bank positive pay match, authentication, authorization, clearing and settlement system with outside financial services provided according to the present invention.

As is shown in FIG. 2, the customer 30 can also upload the check register information to be reconciled to the customer's bank 40. The customer bank 40 then passes the current check register information onto the universal positive pay match, authentication, authorization, clearing and settlement system 10, where the current check register information is reconciled and returned to the customer 30 (via the Internet).

A polling option is also available where the customer 30 may upload their current check register information directly to their bank 40. The universal positive pay match, authentication, authorization, clearing and settlement system 10 may also dial up the bank 40 and poll the current check register information for download into the universal positive pay match, authorization, authentication, clearing and settlement system 10. This polling is automatically done with software that is part of the universal positive pay match, authentication, authorization, clearing and settlement system 10. This is a pass through on the part of the customer bank 40, allowing the customer bank 40 to charge a fee for this service.

Similarly, at the end of each day, the universal positive pay match, authentication, authorization, clearing and settlement system 10 can dial up the customer's 30 location and poll the customer 30 for the current check register information. The polling may occur either by an automatic dial up from the customer 30 to the universal positive pay match, authentication, authorization, clearing and settlement system 10 or by the universal positive pay match, authentication, authorization, clearing and settlement system 10 automatically dialing up the customer 30 and downloading the current check register information. Typically, one type of polling is chosen over another, depending on the customer's 30 preference. Both types of polling utilize software that is incorporated into the universal positive pay match, authentication, authorization, clearing and settlement system 10 and can simply sweep the current check register files and download them into the database 20.

The universal positive pay match, authentication, authorization, clearing and settlement system 10 also utilizes software that searches for and captures escheated check register information. Escheated check register information is information on checks that have not been cashed and are "unclaimed". This software continuously searches for outstanding escheated check register information. The software can track each state's individual escheatment laws and apply those laws which pertain to the customer 30.

Financial instruments that are never presented for encashment or never redeemed are required to be reported as abandoned property in many states. The face value of those instruments must be turned over to the state with a record of the rightful owner on a periodic basis. The data in the universal positive pay check authorization system 10 can be used to generate these reports.

A microcomputer chip can also be embedded within the flat surface of a paper check that could provide current check register information, additional security, digitized information, signatures, PINs and GPS tracking. This provides another fraud deterrent security feature along with the necessary current check registration information to be used in the match, authentication, authorization, clearing and settle 10. This microcomputer chip, if altered or tampered with, can immediately indicate that a document has been falsified or tampered with.

Security detectable inks, tamper-proof foils, electron foils and threads, as well as holograms can also be incorporated into a financial instrument used in the universal positive pay match, authentication, authorization, clearing and settlement system 10 to provide additional security against fraud.

Newly developed wireless devices known as the cell wallet, the palm wallet, the e-wallet, NavCheck and the cam wallet can also be used as part of this universal positive pay match, authentication, authorization, clearing and settlement system 10. Although existing cell phones and palm devices are not a novelty, the cell wallet, the palm wallet, the e-wallet and the cam wallet are novel in being used in conjunction with the universal positive pay match, authentication, authorization, clearing and settlement system 10.

These devices can be placed in a given vehicle and are known as NavCheck devices. For the purposes of making every component user friendly, the NavCheck device would be activated once the vehicle is started. Either a voice or digital message would appear on the screen of the NavCheck device, asking the vehicle owner to enter current written check register information into the device, which would include the check amount, check number and who the check was made out to. The customer account number and date would be preset in the device for transmission of the data to the universal positive pay match, authentication, authorization, clearing and settlement system 10, along with providing the necessary data for the customer's check or card register.

The NavCheck device would have the same capabilities as the cell wallet, palm wallet, e-wallet and cam wallet. A simple plug-in attachment to these devices would allow the download of data and digitized pictures to the universal positive pay match, authentication, authorization, clearing and settlement system 10. With a microcomputer chip, a lost, stolen or forged check can also be located through a global positioning system (GPS) utilizing the NavCheck device to locate the paper check or card. These devices also allow ease for the customer 30 to use electronic checks and transmit the check data to the universal positive pay match, authentication, authorization, clearing and settlement system 10.

These new devices will have the capability to have a refillable ball point pen with an optical character reader that records all of the current check registration information of the check written. These devices will also have the capability to have voice recognition. As the customer 30 writes the check, they simply state the current check register information. The device will already have the customer's 30 account number and date preset, thus the data is entered into the device and a signal sent daily downloading the wireless check register of these wallet devices to the universal positive pay match, authentication, authorization, clearing and settlement system 10. These devices will also have the capability to have optical character recognition scanning to allow the customer 30 to scan the check that was just written, and or digitize the check.

If a customer 30 elects not to carry a paper checkbook or single paper check, they may utilize the option of converting to an electronic check through these devices. The customer 30 may also elect to key in the check data by punching in the correct data on a keypad. All methods on these newly invented devices are for the purpose of providing another means for the customer 30 to provide the necessary check registration information to the universal positive pay match, authentication, authorization, clearing and settlement system 10.

Figure 3:
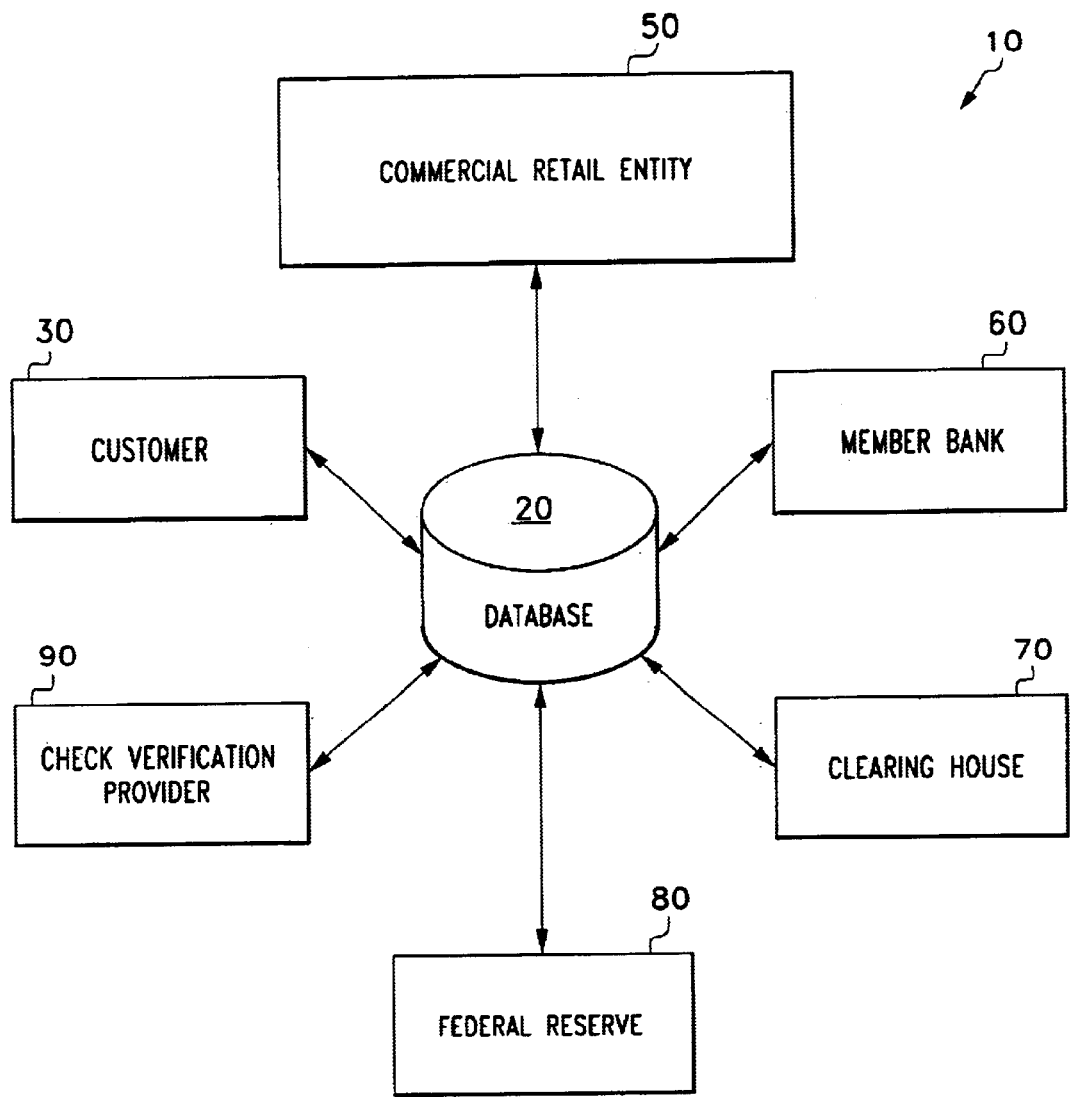
FIG. 3 is a diagram of parties involved with an Internet and land based central data bank positive pay match, authentication, authorization, clearing and settlement system with check verification provided according to the present invention.
Figure 4:
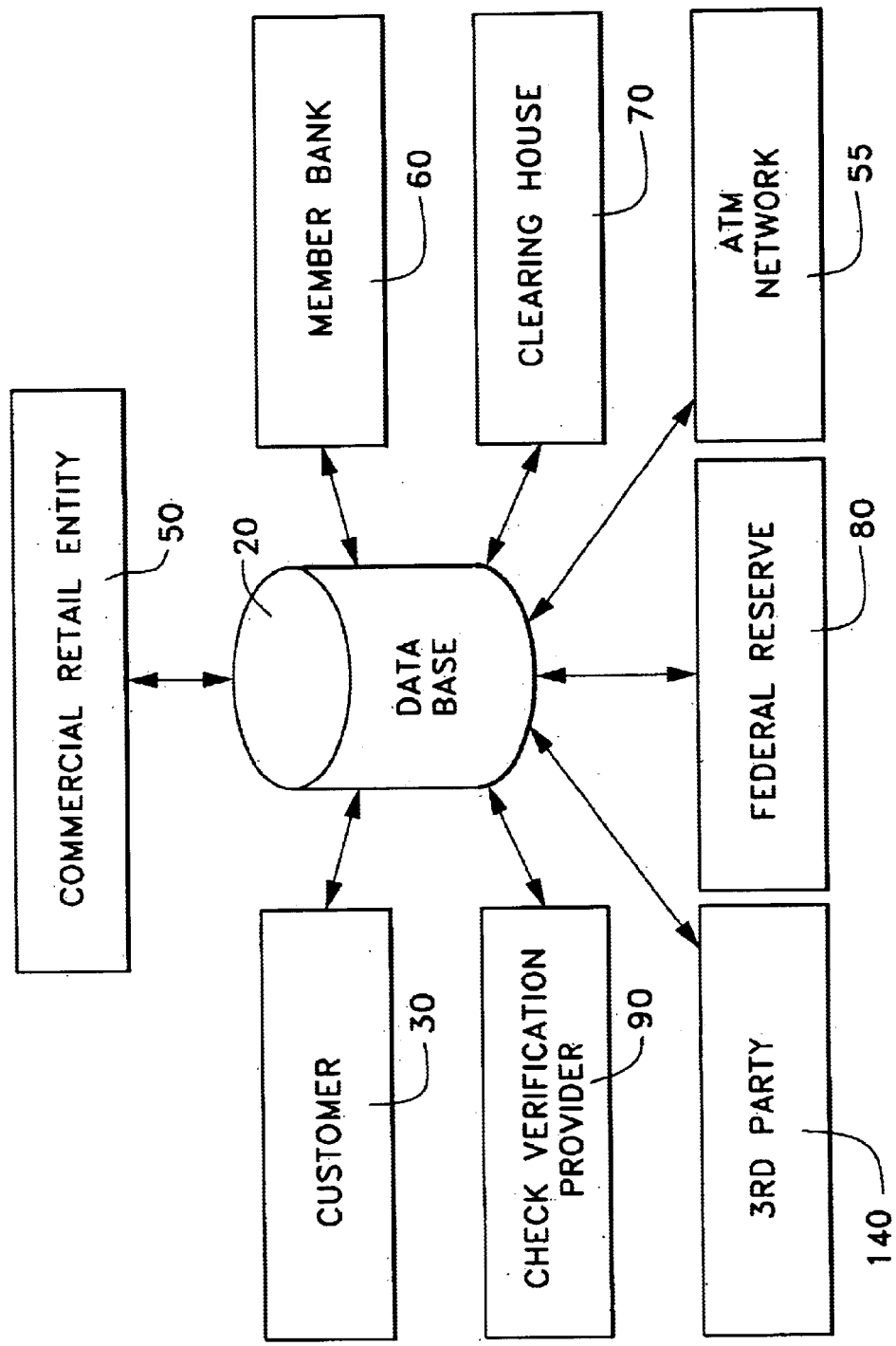
FIG. 4 is a diagram of parties involved with an Internet and land based central data bank positive pay match, authentication, authorization, clearing and settlement system with check verification and outside financial services provided according to the present invention.

One of the more important features of the universal positive pay match, authentication, authorization, clearing and settlement system 10 is check verification services, which are outlined in FIG. 3 and FIG. 4. The check verification services feature allows the commercial retail entity 50 to access the customer's 30 history of writing checks, giving a negative or positive rating. This can be done in addition to accessing the previously discussed check register information.

When a given commercial retail entity 50 is presented a customer's check at the point of sale, the commercial retail entity 50 sends the universal positive pay match, authentication, authorization, clearing and settlement system 10 a signal which is then sent to the check verification services provider 90. The check verification services provider 90 then accesses the customer's 30 check history and gives a positive or negative rating based on whether there are any checks that have not been honored. If there are any dishonored checks written presented by the customer 30, a negative rating will be given. If there are no dishonored checks, a positive rating will be given.

Once the rating has been established, a signal is then sent back to the universal positive pay match, authentication, authorization, clearing and settlement system 10 and back to the commercial retail entity 50 (typically over the Internet). It is up to the commercial retail entity 50, what to do with this rating. In other words, it is up to the commercial retail entity's 50 discretion whether to accept a customer's 30 check based on this rating.

Figure 5A:
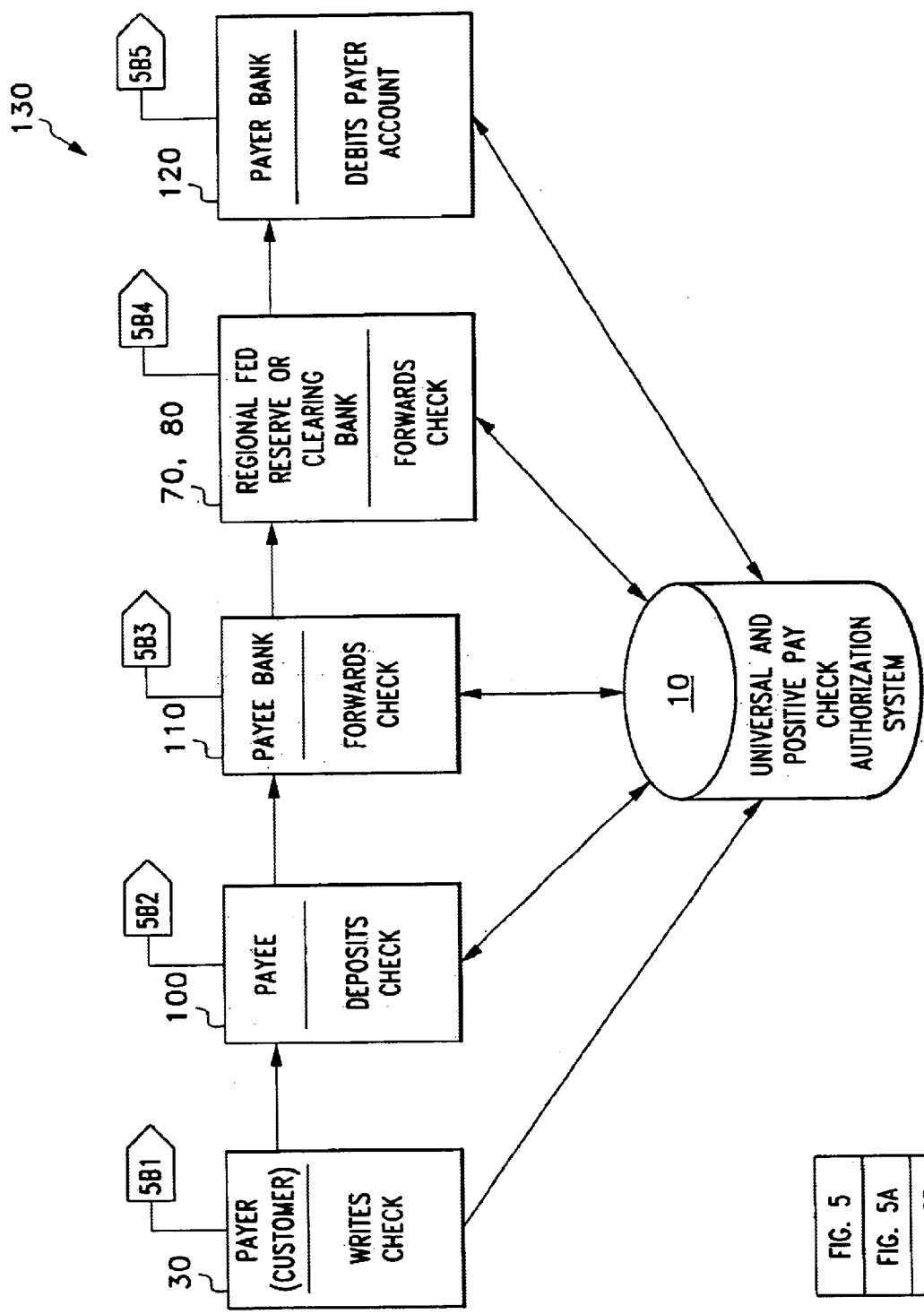
FIGS. 5A and 5B are a flow diagram of a universal positive pay method for checking accounts according to the present invention.
Figure 5B:
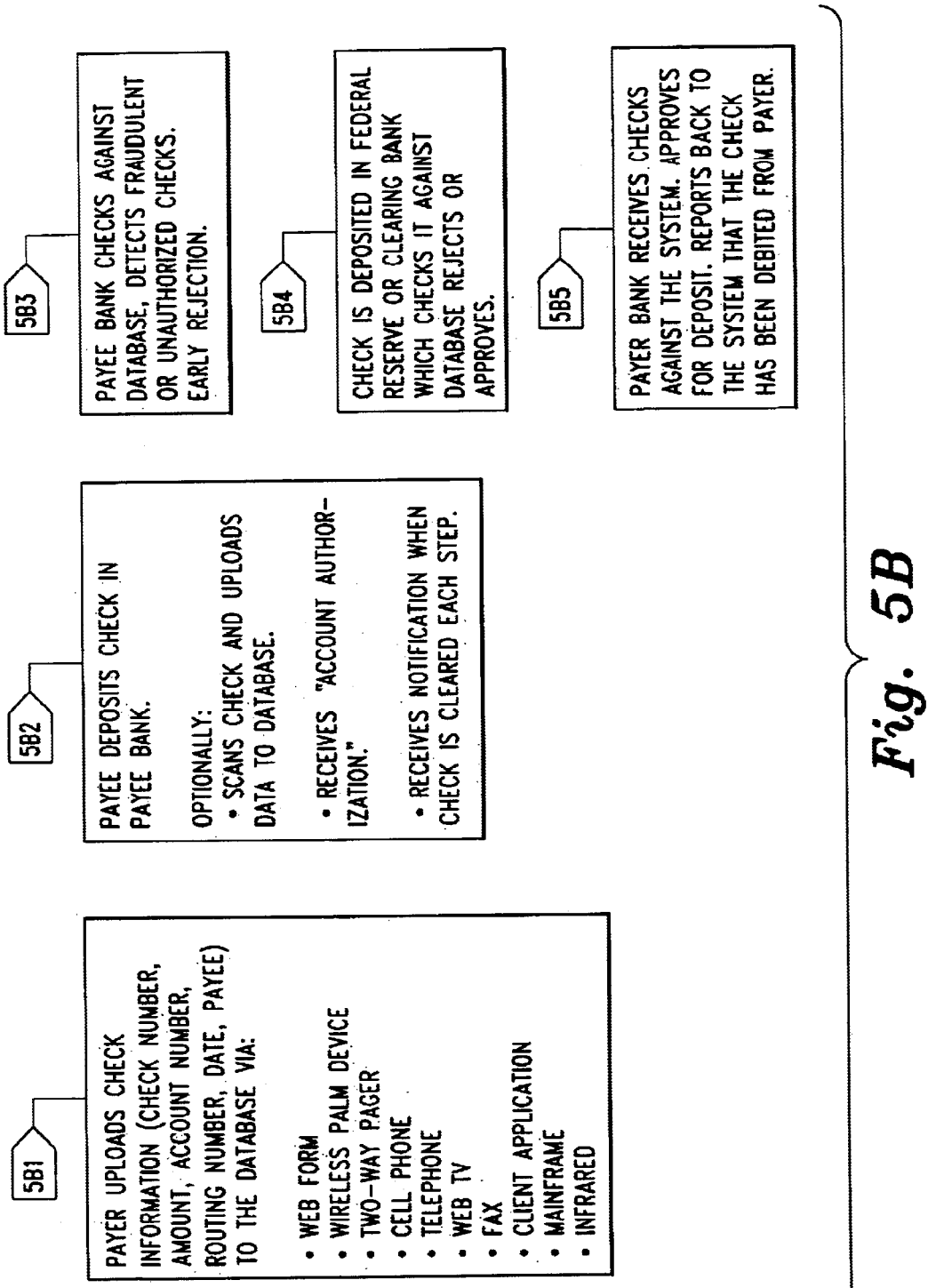

As shown in the flow diagram in FIG. 5A and FIG. 5B, each participant in the check clearing process (payer customer 30, payee 100, payee bank 110, Federal Reserve 80, clearing bank 70, or payor bank 120), participates in a universal positive pay match, authentication, authorization, clearing and settlement system method 130 used by a payer (customer) 30 for maintaining check payment control and preventing check fraud. The universal positive pay match, authentication, authorization, clearing and settlement system method 130 comprises a series of steps in which payer 30 uploads check information to the universal positive pay match, authentication, authorization, clearing and settlement system 10, payee 100 deposits check in payee bank 110, payee bank 110 checks the check against database 20 in the universal positive pay match authentication, authorization, clearing and settlement system 10, check is deposited in Federal Reserve 80 or clearing bank 70, which checks it against the database 20, payor bank 120 receives check and checks it against the database 20 and reports back to the universal positive pay match authentication, authorization, clearing and settlement system 10 that the check has been debited from payer's 30 account.

The first step of the universal positive pay match, authentication, authorization, clearing and settlement system method 130 is uploading check register information into the universal positive pay match, authentication, authorization, clearing and settlement system 10. As indicated earlier, this information includes a check number, a check amount, an account number, a routing number, a check date, signature and signature digitalization and a payee 100. This information is stored in the database 20 and is compared with the information that is on the physical check as it runs through each step of the check clearing process. The payer 30 also physically writes the check and gives it to the payee 100 before the check register information is uploaded into the universal positive pay match, authentication, authorization, clearing and settlement system 10.

As touched on earlier, there are numerous ways that check register information can be uploaded into the universal positive pay match, authentication, authorization, clearing and settlement system 10. These include a Web form on the Internet, where an account holder goes to a private Web page and enters the check register information. There are also client application software programs that can reside on an account holder's computer and transmit the check register information via modem and a non-network connection to the universal positive pay match, authentication, authorization, clearing and settlement system 10. Voice activated client software that receives check register information input via voice can also be used and is known to those skilled in the related art.

Scanner technology attached to a computer that reads a check and transmits data, as well as bar code readers, can also be used to upload check register information. Ordinary telephone data entry that uses keypad input can be used to transmit data as well as 2-way paging devices, including infrared and laser technologies. Even ordinary mail or delivery services can be used to deliver data to the physical address of the universal positive pay match, authentication, authorization, clearing and settlement system 10 (to be entered by hand).

The second step of the universal positive pay match, authentication, authorization, clearing and settlement system method 130 involves the payee 100 receiving the physical check and depositing the check into his or her bank account at the payee's bank 100. The payee's bank 100 utilizes optical character recognition, infrared, laser check reader devices or magnetic ink character recognition technology to scan the check and upload the check register check information to the database 20 (usually via the Internet). This is usually done automatically with the polling software previously discussed. The universal positive pay match, authentication, authorization, clearing and settlement system 10 receives notification when the check clears, as it will for each redundant step of the check clearing process.

The third step of the universal positive pay match, authentication, authorization, clearing and settlement system method 130 involves the payee's bank 100 checking and verifying the check register information from the check with the check register information from the database 20. This is done to detect fraudulent tampering or unauthorized use of the check early in the check clearing process and is an advantage over some of the current methods outlined in the related art.

The fourth step of the universal positive pay match, authentication, authorization, clearing and settlement system method 130 involves the payee's bank 100 depositing the check into a regional Federal Reserve Clearing Division 80 or clearing house 70. Like the previous step involving the payee's bank 100, the Federal Reserve 80 or clearing house 70 checks the check against the universal positive pay match, authentication, authorization, clearing and settlement system 10 for check tampering or fraud again for added security and redundancy.

The fifth step of the universal positive pay match, authentication, authorization, clearing and settlement system method 130 involves the Federal Reserve 80 or clearing house 70 sending the check to the payer's bank 120. The check is again checked and compared with the check register information in the database 20 for check tampering and fraud by the payer's bank 120, which approves the check for payment. The check is then debited from the payer's 30 account and the universal positive pay match, authentication, authorization, clearing and settlement system 10 is notified, which is the sixth and final step of the universal positive pay match, authentication, authorization, clearing and settlement system method 130.

Each participant in the check clearing process has an opportunity to add to and receive information from the universal positive pay match, authentication, authorization, clearing and settlement system 10. This information can be used for account verification and notification of a check that was rejected due to unauthorized issue, evidence of tampering or account owner cancellation. Status of a check as to where it is in the clearing process is also readily available. A check query notice is sent to a payer 30 whenever their records are accessed and a deposit acceptance notice is sent to a payee 100 and payer 30 when a check is accepted.

Figure 6:
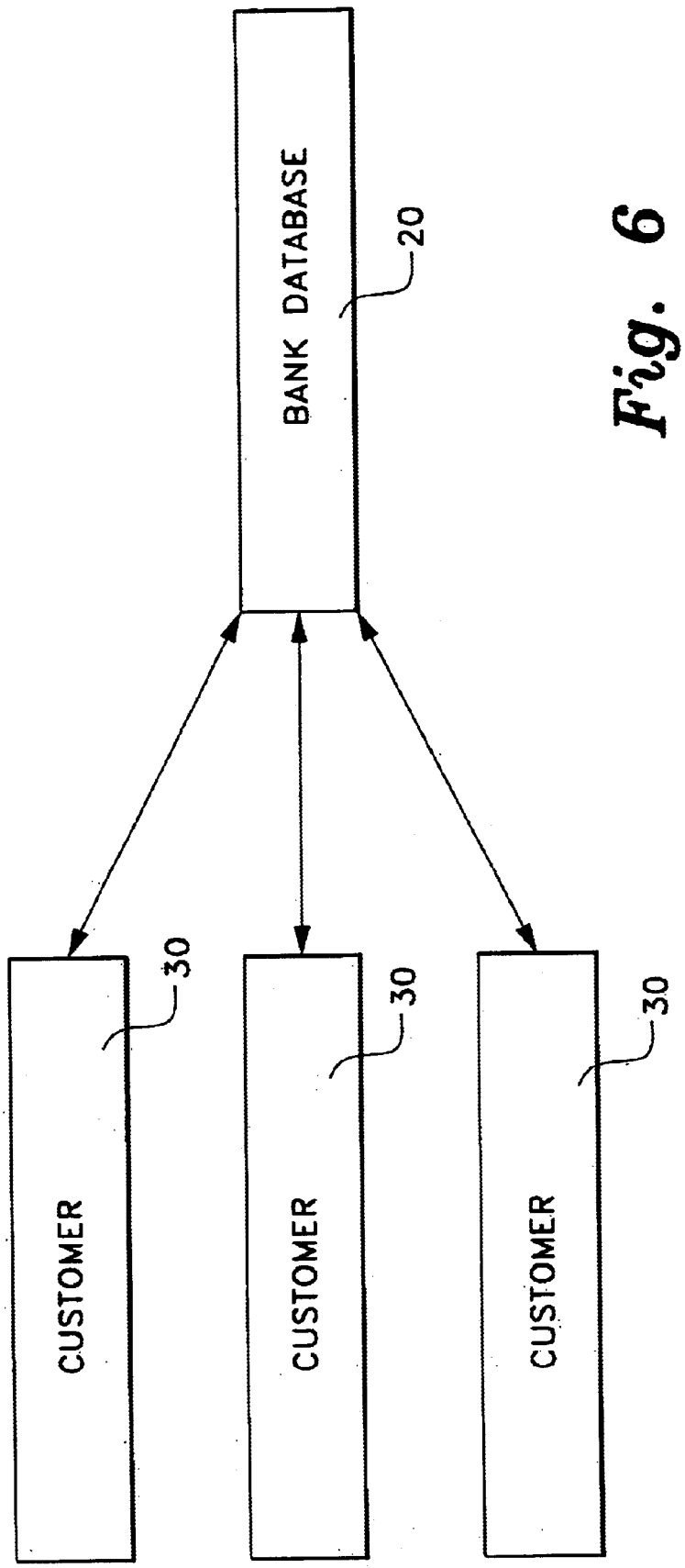
FIG. 6 is a flow diagram illustrating bank specific positive pay.
Figure 7:
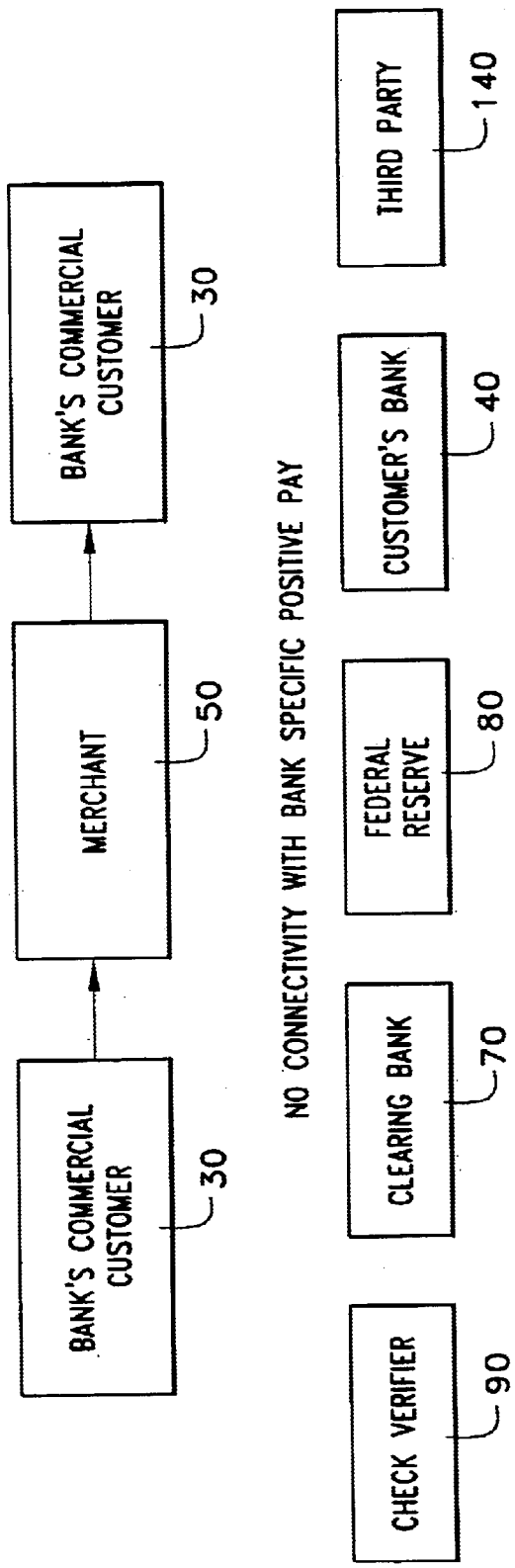
FIG. 7 is a flow diagram showing no connectivity with bank specific positive pay.
Figure 8:
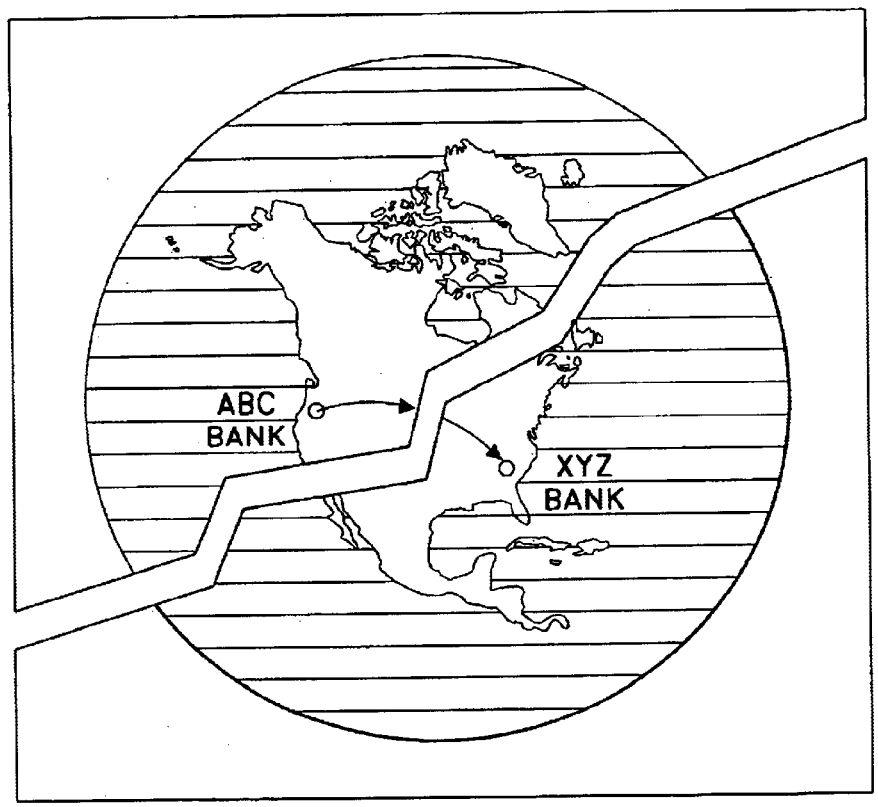
FIG. 8 is a diagram showing why check fraud works today.

It should be noted, as seen on FIGS. 6, 7, and 8 that the universal positive pay match, authentication, authorization, clearing and settlement system 10 exists today in the financial industry. However, it is defined as bank specific positive pay. Bank specific positive pay is nothing more than a customer 30 downloading his check register to their bank 60 daily. Like living on a cul-de-sac, the customers 30 and the bank 60 only have communication with themselves and anyone who is a neighbor customer only banking with that specific bank on that system. If they live on the next block, next city, or another state, they have no way to communicate. There is no connectivity, as noted on FIG. 7 and FIG. 8.

Another example of use for the universal positive pay match, authentication, authorization, clearing and settlement system 10 is that the declarations page of an insurance policy can be provided with a series of numbers identical or similar to a MICR line across the bottom of a check. Within this line would be the policy number, issue date, policy amounts and effective dates. All of the information would become similar to a check register and could be downloaded from an insurance company to the database 20. The positive match between the file accepted from the carrier issuing the policy and that received from the agent keeps the policy from being altered. This is but one of many potential uses for the universal positive pay match, authentication, authorization, clearing and settlement system 10.

The universal positive pay match, authentication, authorization, clearing and settlement system 10 also allows for complete connectivity, allowing banks 60, commercial retail entities 50 and even customers 30 to communicate directly or indirectly through the database 20 by matching the positive data sent by the customer 30. The customer 30 can upload his check register of written checks to the bank 60 under bank specific positive pay, but is then restricted from a universal verification for authenticity.

Figure 9:
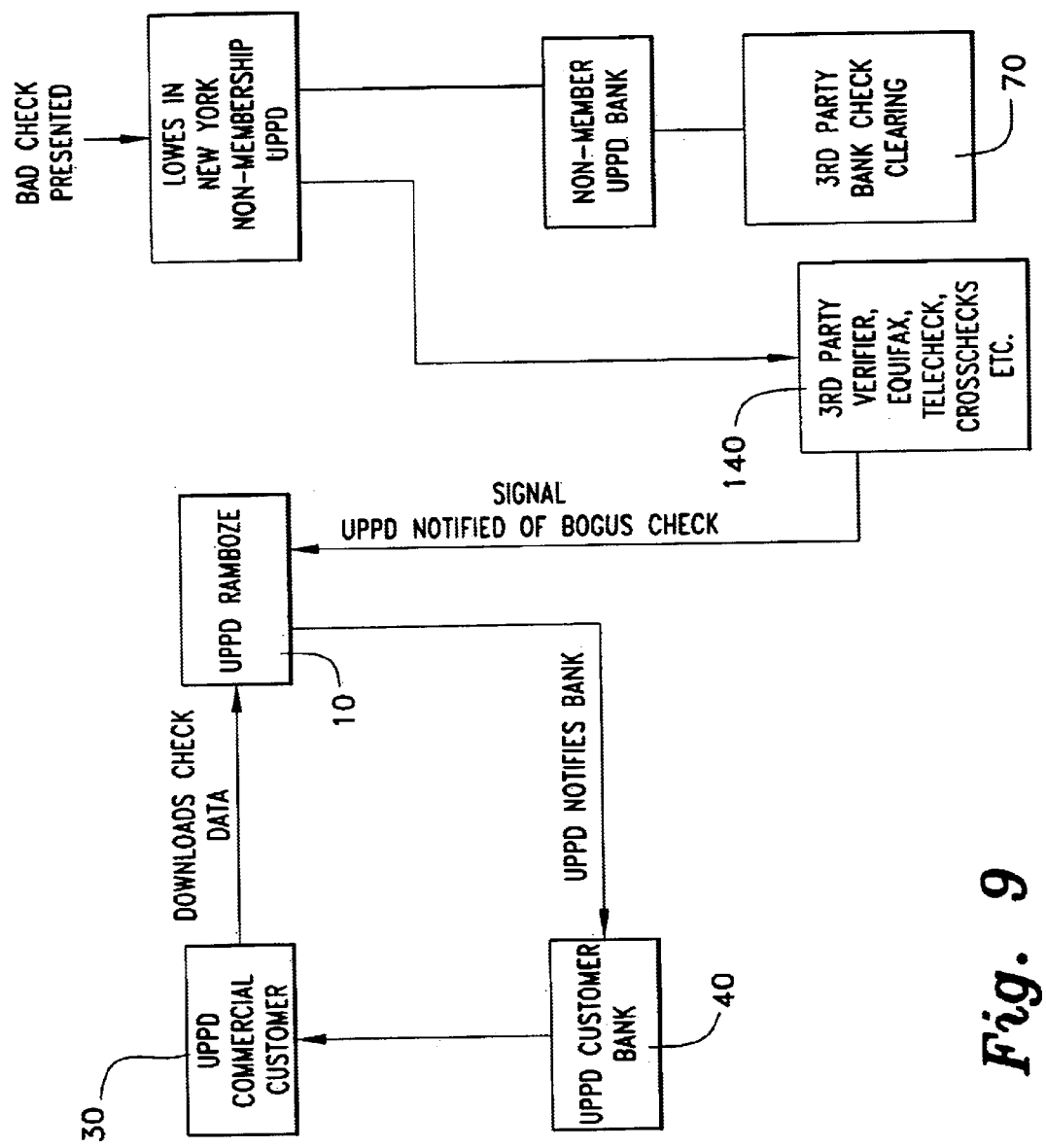
FIG. 9 is a flow diagram indicating how the universal positive pay match, authentication, authorization, clearing and settlement system processes a bad check.

Under the match, authentication, authorization, clearing and settlement system 10, the customer 30 uploads his check register directly to the database 20. Any member commercial retail entity 50 or contracted third party verifier 140 can send check data to the database 20 for verification. This is shown in FIG. 9.

The signal passes through the match, authentication, authorization, clearing and settlement system 10 for matching. If the signal matches the check register data present, the signal is then sent to the customer's bank 40, where it checks for sufficient funds, stop payments, liens, account status (open or closed), funds available to cover any check (overdraft protection, etc.), and any other verifications to provide a signal back through the universal positive pay match, authentication, authorization, clearing and settlement system 10, enroute to the querying party to either accept, reject or not approve the check. If there has been a fraud, it is discovered instantly. If there are insufficient funds, the bank may elect to approve or reject based on its customer relationship.

Figure 10:
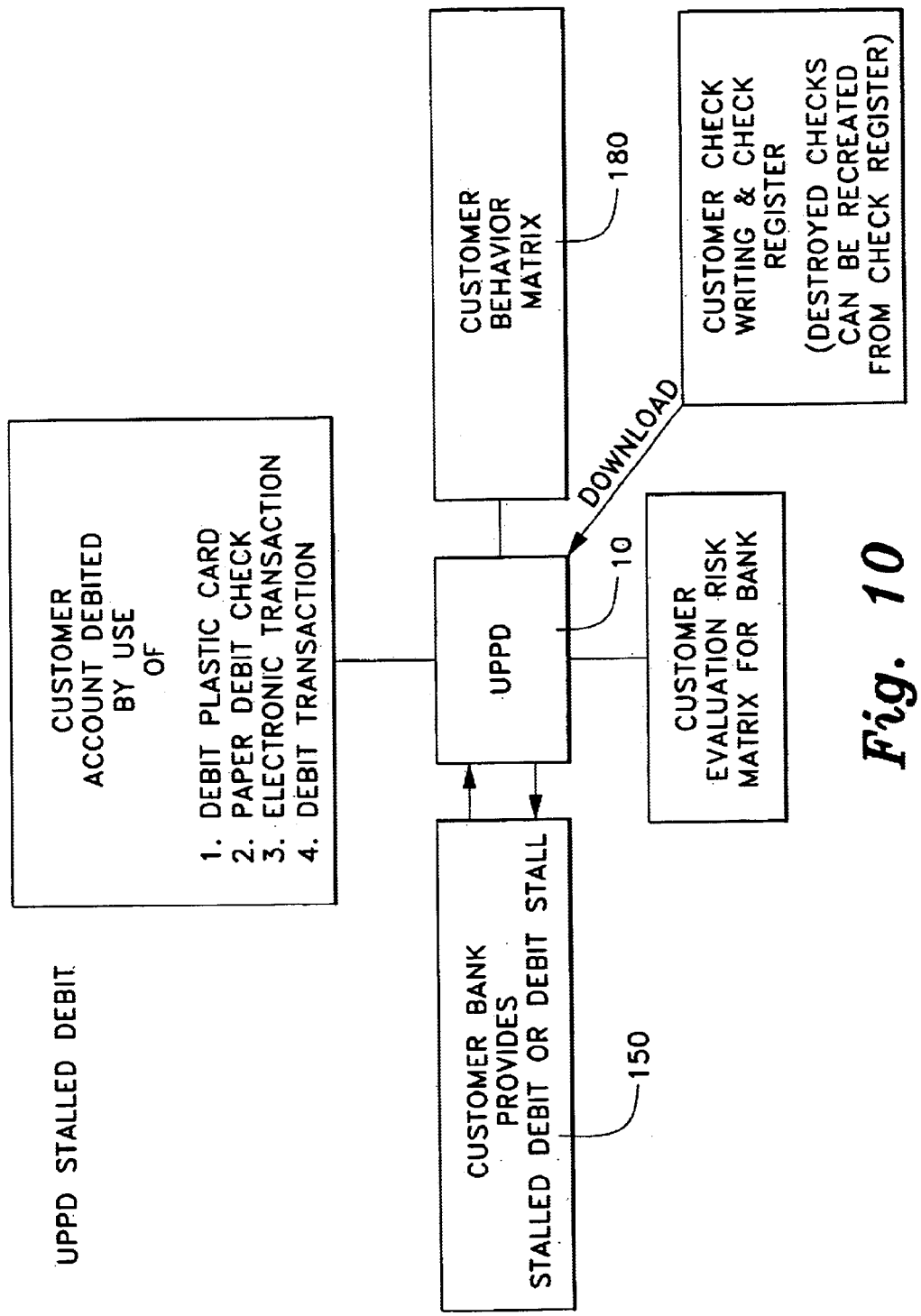
FIG. 10 is a diagram indicating how stalled debt or debit stall is used by the universal positive pay match, authentication, authorization, clearing and settlement system.

As shown in FIG. 10, the universal positive pay match, authentication, authorization, clearing and settlement system 10 may utilize stalled debit or debit stall services 150 provided by the bank 60. Normally, when a check is presented, based on the bank's 60 customer relationship or contractual relationship, the bank 60 would be allowed to debit the customer account immediately under normal debit procedures.

The stalled debit 150 allows the institution to stall the debit by issuing a credit to the commercial retail entity 50, financial institution or party seeking the debit. The stalled debit 150 provides that the amount of the debit from a check, a debit check or a debit card, allows the institution and their customer the use of a float. The money in the account is held at the side and awaits the normal check clearing, electronic, paper or plastic procedure to take the allotted time by the Federal Reserve 80 to allocate the cash from this transaction.

The debit stall 150 sets aside the money for the transaction within the customer's bank 40. If the next check that comes in is now over the balance within the customer's 30 account, the institution, based on their customer relationship, can reject the next transaction and state insufficient funds, or accept the transaction and stall the debit based on overdraft protection from charge cards, direct bank loans, zero balance account or any other method the bank 40 feels necessary to provide to their customer 30.

Figure 11:
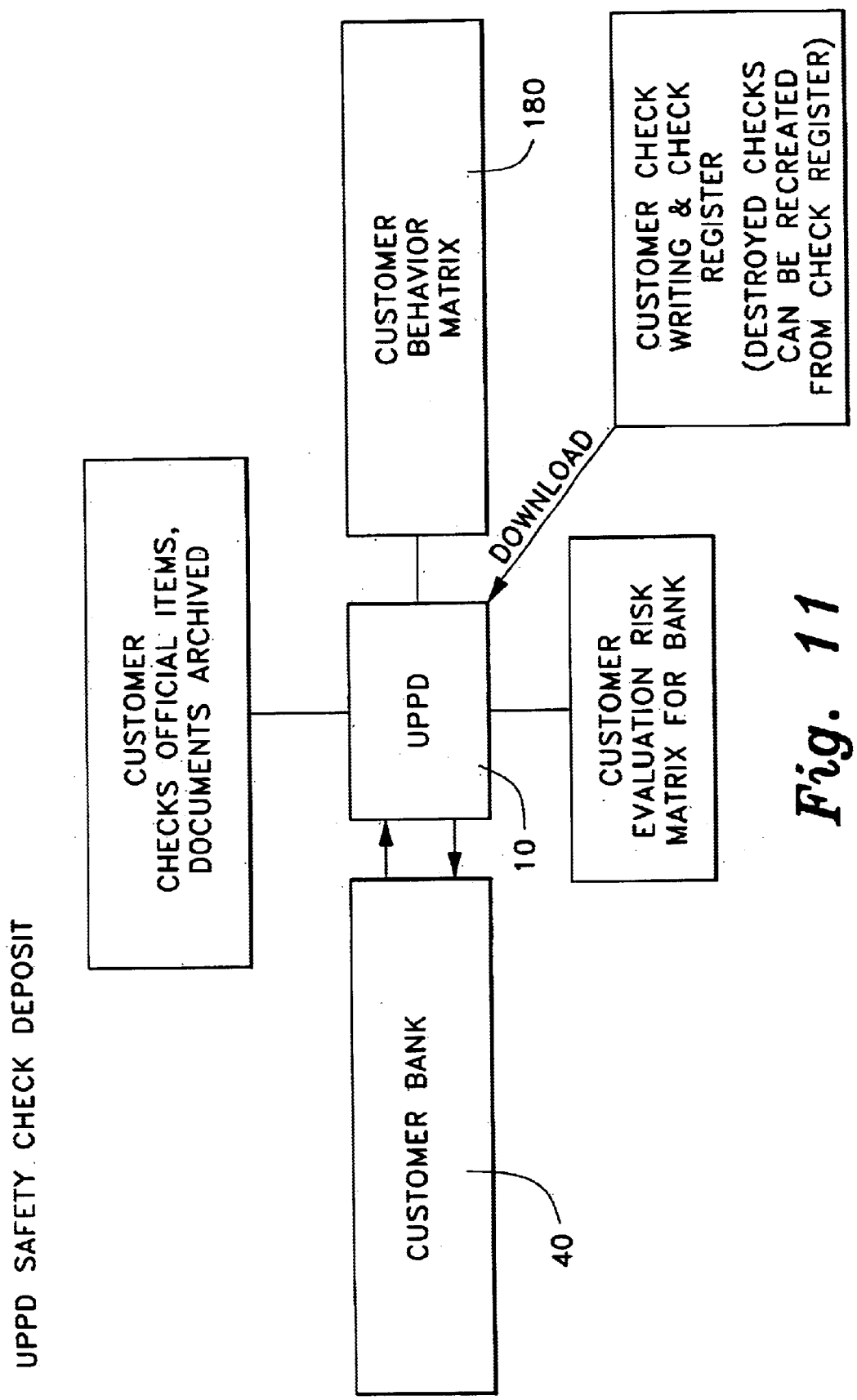
FIG. 11 is a diagram indicating how Safety Check Deposit software is used by the universal positive pay match, authentication, authorization, clearing and settlement system.

As a result of the universal positive pay match, authentication, authorization, clearing and settlement system 10, the check register, matching data, verification data and authentication data will be archived and stored for a period of seven years. This will be referred to as a Safety Check Deposit 160, as depicted in FIG. 11. For a fee, the data will be stored and recaptured for the customer 30 or customer bank 40 for retrieval on disasters, catastrophes, bankruptcy, law suits, tax audits, probate and estate re-creation, along with many more reasons the customer 30 might wish for check data retrieval. These may also be subscribed to under the Fair Credit Reporting Act.

There are two tiers of tracking for checks, official items, gift certificates, money orders and other types of data, such as pharmaceutical data, medical data, insurance data and other financial services. The first tier, which utilizes Track-Back software, will have the universal positive pay match, authentication, authorization, clearing and settlement system 10 track and search for outstanding codes, numbers and encrypted data on an item waiting to be redeemed, cashed or provided at a point of presentment.

Figure 12:
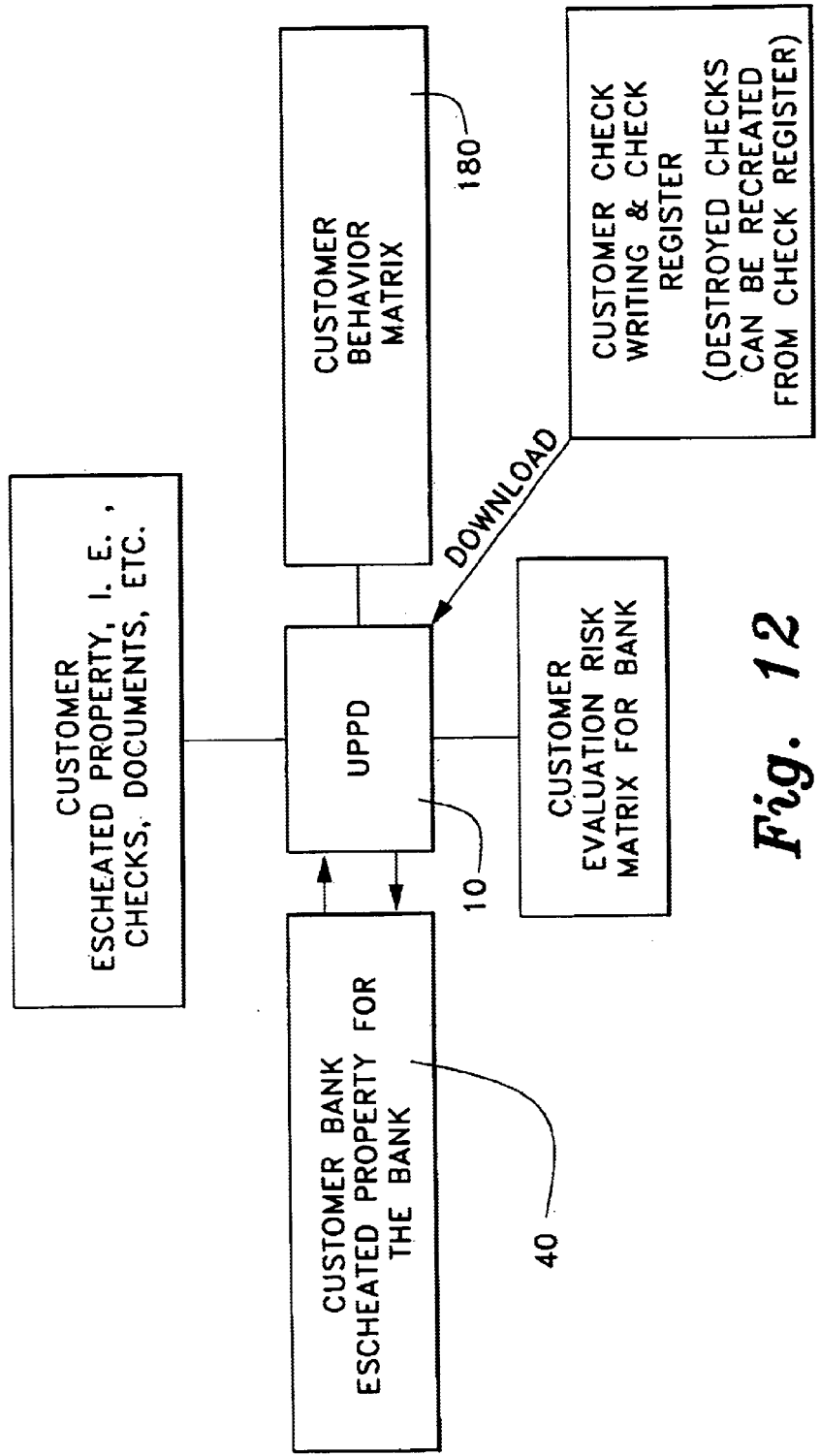
FIG. 12 is a diagram indicating how TrackBack software is used by the universal positive pay match, authentication, authorization, clearing and settlement system.

The TrackBack software will provide exclusive use to the customer 30 in locating lost, stolen, misplaced items, or items not presented and that remain outstanding. The second tier of the TrackBack software will be utilized for locating instruments through a global positioning satellite (GPS). Additionally, instruments of any value may be located in the event of stolen, lost, fraudulent or forged documents. This is also depicted in FIG. 12.

Figure 13:
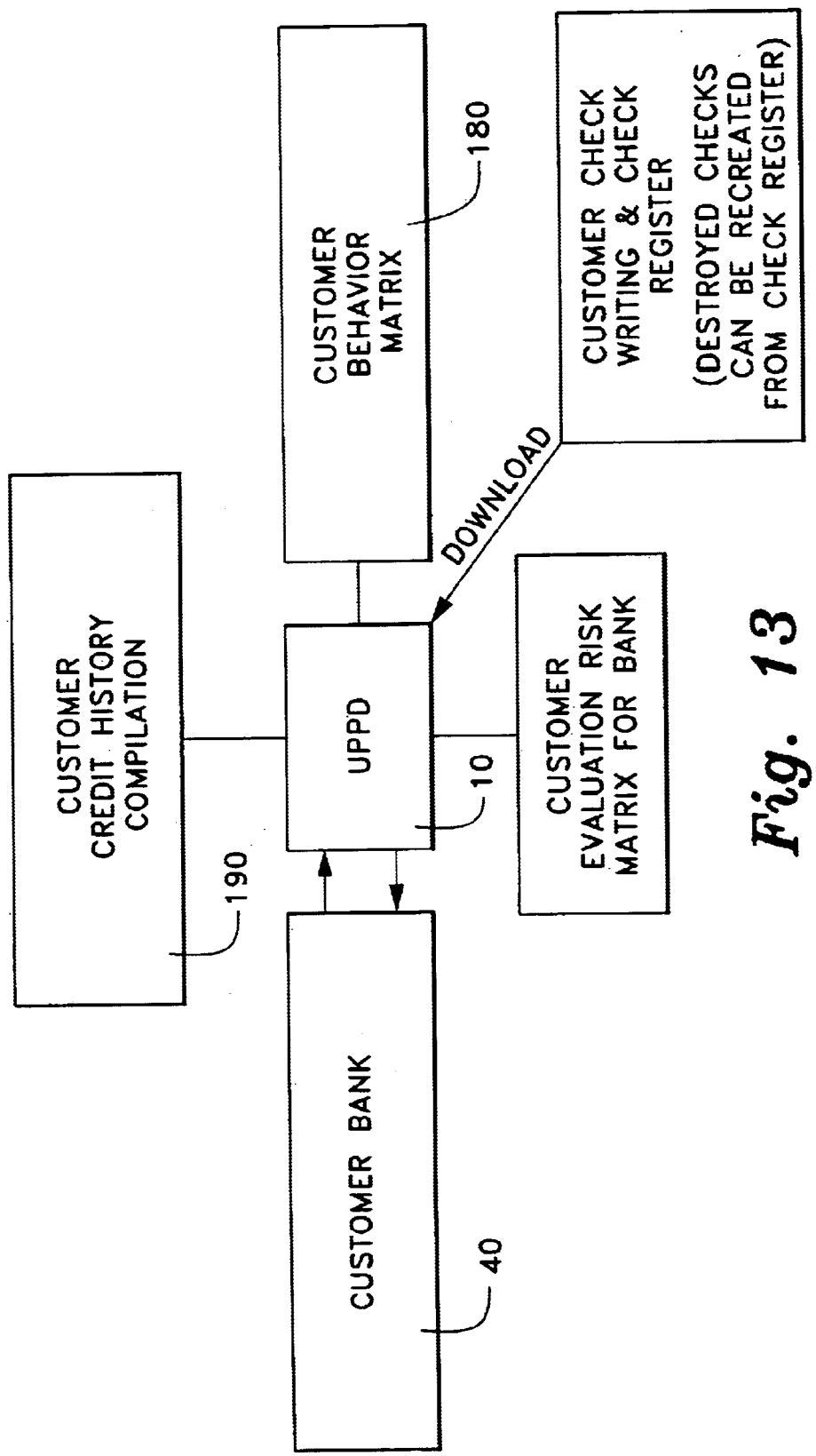
FIG. 13 is a diagram indicating how a credit history compilation is used by the universal positive pay match, authentication, authorization, clearing and settlement system.

As shown on FIG. 13, a complete historical behavior of customer 30 check writing habits will be compiled to provide another level of security. If a customer writes twenty checks a month, the customer's behavior matrix 180 will track this, much like a credit card. If a large check arises or checks appear from different parts of the country outside a customer's 30 residence, an alert will prompt an abnormality from the customer's behavior matrix 180 and trigger a confirmation that any changes are not security breaches on historical data compiled.

With the historical check writing data compiled from the database 20 and the customer's behavior matrix 180, a complete credit history 190 will be generated. The database 20 will compile credit histories for the proper parties, including the customer's 30 usage for fraud, insufficient funds, late pays, etc. This also meets the requirements for the Fair Credit Reporting Act.

The universal positive pay match, authentication, authorization, clearing and settlement system 10 can also operate in a peer to peer mode. This allows a financial institution, ATM network 55 or other entity to house a host or server. This host/server configuration would allow an institution the ability to secure data from their customer 30 and pass this directly to the universal positive pay match, authentication, authorization, clearing and settlement system 10. This allows the institution the ability to house their own customer accounts securely on their own server.

A peer to peer mode also allows the entity the option to carry the data load and have an off-site source universal positive pay match, authentication, authorization, clearing and settlement system 10 for back-up and catastrophe handling, along with connectivity from peer to peer. All of the transmissions would still occur as stated to allow the connectivity to multiple sites in lieu of being bank specific.

The term "reverse pay" or "negative pay" is similar to the "positive pay" match, authentication, authorization, clearing and settlement 10, except that the process is reversed with the customer 30 that downloads their check register. Like "positive pay", reverse pay is utilized as bank specific, and thus it has no connectivity. It does not allow point A to communicate beyond point B through the database 20 and the many networks connecting all points to the database 20.

With reverse pay or negative pay, not only does the account keep a list of issued checks, through their check register, but the database 20 keeps a list of the customers' issued checks. When a check is presented for payment and clears through the Federal Reserve 80, the Federal Reserve 80 prepares a file of the dollar amounts of the checks, serial numbers and account numbers, and sends the file to the financial institution on a bank specific reverse pay format.

In reverse pay (bank specific), the financial institution sends the file to the customer 30, where the customer 30 compares the information to its internal records. The customer 30 lets the financial institution know which checks match its internal information and the financial institutions pays those items. The financial institution then researches the checks that do not match, correcting any encoding errors and any misreads and determines if the items are fraudulent. The financial institution pays only the real or true exceptions that can be reconciled with the customers' files.

Universal reverse pay or universal negative pay takes this reverse match to an even higher level of security by having all pass through the database 20 back to the bank 60 and the customer 30 and uses either the debit stall or stalled debit 150 to hold funds, but assure the debtor that the funds are not insufficient funds. They are in a stalled debit 150 stall and are transferred once the check goes through the regular and normal clearing process and funds availability requirements. The debtor to a debit plastic card or debit paper check can be given a credit slip on verification of authenticity.

A check writing software package, known as DirectCheck, will be provided to the bank 60 and its customers 30, that utilize the match, authentication, authorization, clearing and settlement system 10 or the reverse pay/negative pay module, allowing connectivity to various networks, communications devices and the Internet. This DirectCheck software will run on MICR laser printers of various manufacturers and provide security features in printing on blank secure paper checks, official items, financial items and other documents. The TrackBack software would also be included in the DirectCheck software.

Customers 30 will provide signatures for all official items to be used by the universal positive pay match, authentication, authorization, clearing and settlement system 10. The signatures will be digitized and recognition software will verify signature matrixes for any abnormalities.

The universal positive pay match, authentication, authorization, clearing and settlement system 10 also has the ability to allow or provide imaged, digitized or electronic conversions of debit checks, plastic check cards, smart cards and paper checks from devices included within the universal positive pay match, authentication, authorization, clearing and settlement system 10. The universal positive pay match, authentication, authorization, clearing and settlement system 10 will issue or accept digitized checks for clearing, matching, verifying and authenticating. Information such as check amounts, coding, routing numbers, check dates, signatures, digitized signatures, matrixes and account numbers will be verified for a positive match.

The universal positive pay match, authentication, authorization, clearing and settlement system 10 provides that check readers continue in the retail marketplace, as has been custom. It is the intent of the check readers to be placed at every teller station and on the ATM network stations 55. For readers that will provide check data, digitalization will be utilized to place the readers at every possible location accepting checks, debit cards and paper debit checks along with the deposit of any other official item. These readers will transmit, via a purchased direct line, information to the universal positive pay match, authentication, authorization, clearing and settlement system 10. Currently, the positive 10 will utilize existing networks, such as ATMs 55, AT&T frame systems, automated clearing house 70 networks, credit card networks and third parties 140, such as TeleCheck, Equifax and CrossChecks.

Electronic foils can be embedded within plastic and paper instruments to transmit the written material data from a customer 30. Foils and chips within the instruments will provide additional security with encrypted serialized match numbers. The universal positive pay match, authentication, authorization, clearing and settlement system 10 will require check readers and credit card readers to transmit a personalized digitized signature band or wavelength to any waiting devices for data recovery and instant transmission. These chips and foils may be programmable and are part of a global positioning satellite (GPS) system. A special watermark or hologram can also be placed on these instruments for further security.

A customer 30 can also receive rewards for proper and timely exchange of pertinent data. These rewards can include frequent flyer miles as well as travel or other merchandise.

Figure 14:
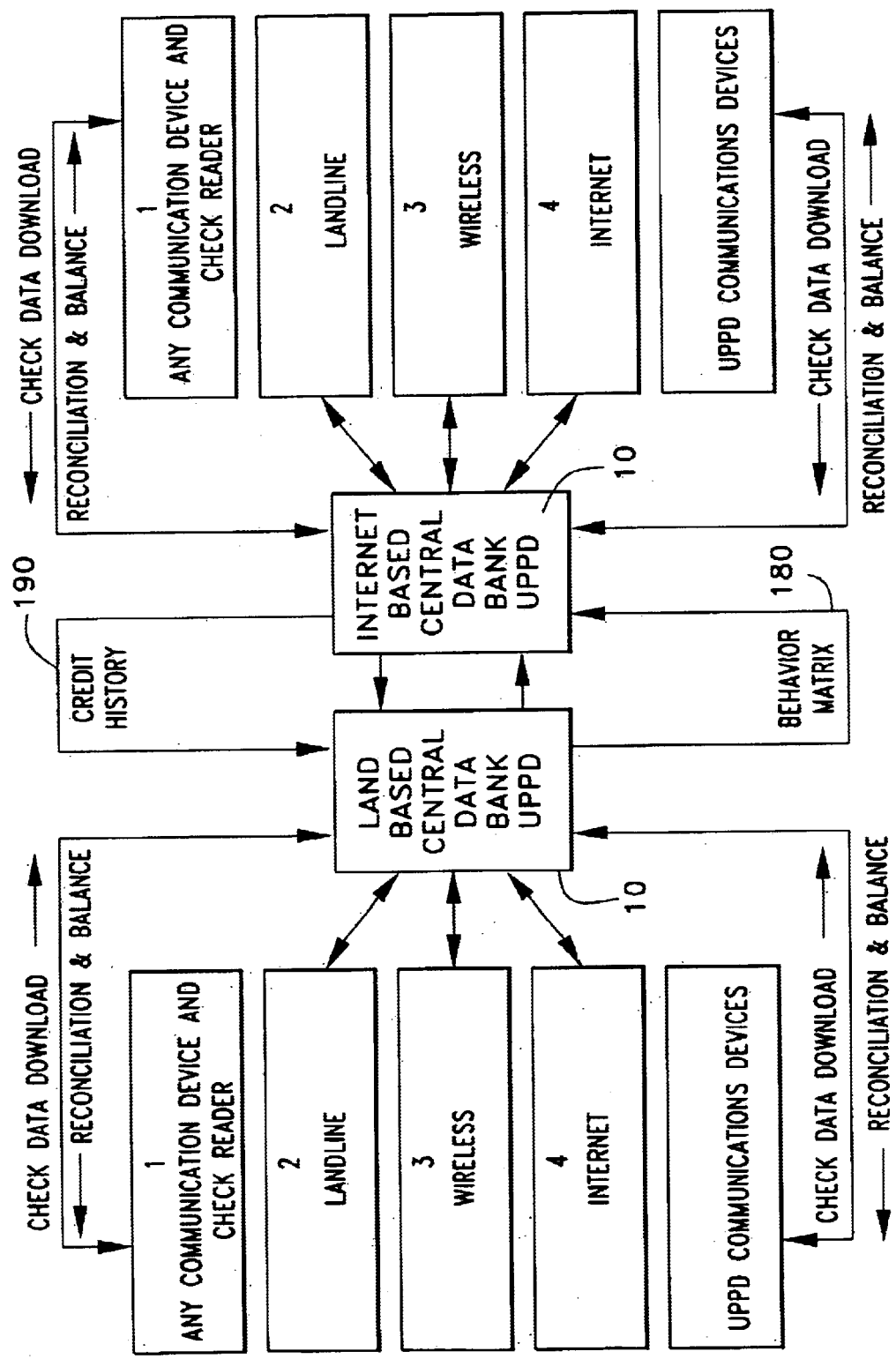
FIG. 14 is an overview of a diagram showing different communications methods used by the universal positive pay match, authentication, authorization, clearing and settlement system.

The universal positive pay match, authentication, authorization, clearing and settlement system 10 will also provide the capturing and storing of electronic presentation or payment of checks. This includes capturing and storing electronic images of checks. By matching the universal positive pay match, authentication, authorization, clearing and settlement system 10 protocol, these checks allow financial institutions to make payment decisions in real-time by getting access over the Internet, peer to peer transmissions, modems, landlines, wireless systems, check readers and other communications devices, as shown in FIG. 14.

The electronic processing of the universal positive pay match, authentication, authorization, clearing and settlement system 10 will also allow customers 30 to view their check register immediately in real-time to determine exceptions, stop pays, insufficient funds, missed items, cancelled checks and voids. A customer 30 writes a check at the point of purchase, point of encashment and/or point of presentment and the check information, which can be digitized, imaged or copied, is sent to the universal positive pay match, authentication, authorization, clearing and settlement system 10 for authorization and authentication. This same process can also be done through a third party 140 sending the check data to the universal positive pay match, authentication, authorization, clearing and settlement system 10.

Once the transaction is completed and approved, the customer 30 signs an authorization slip. The customer 30 is provided with a copy of the authorization slip stamped or printed on the back of the check or debit check as "cancelled or voided". The debit check or check is cancelled and can be returned to the customer 30 on the spot. Since the checks have been converted electronically, they can be transmitted from either the commercial retail entity 50 directly to the merchant bank or through the universal positive pay match, authentication, authorization, clearing and settlement system 10, to provide a batch of electronically authenticated electronic checks for deposit and use of either the ACH 70, EFT and stalled debits 150 by the financial institution to the customer's 30 account.

As a result, check clearing is done instantly rather than through the cumbersome check clearing system that currently exists. The cancelled check image, digitalization or data from the check can be archived for the customer 30, the bank 60 and commercial retail entity 50 as described in an universal positive pay, universal reverse pay or universal negative pay system. This provides the universal positive pay match, authentication, authorization, clearing and settlement 10 the customer's 30 check writing behavioral matrix 180 and the credit history 190 gathered on the customer 30, and provides the universal positive 10 with the ability to guarantee payment of check funds.

Additionally, the universal positive pay match, authentication, authorization, clearing and settlement system 10 will have the ability to accept relationships with third parties 140, bank clearing houses 70, ATMs, check guarantee firms and more. This further allows additional security, lower check fees, lower check clearing fees, returned checks, and allows all parties to settle and balance, including real-time check reconciliation for the customer 30, the commercial retail entity 50 and the bank 60.

This also allows the universal positive pay match, authentication, clearing and settlement system 10, the bank member 60 and the customer 30 the ability to guarantee checks for ISF and more importantly, authentication and detection of fraud on debit cards, debit checks, plastic check cards, smart check cards, payroll cards, cash cards and paper checks instantly. This allows safer use and guarantees imaged, digitized and electronic check conversions to all parties involved.

The universal positive pay match, authentication, authorization, clearing and settlement system, 10 allows a customer 30 and bank member 60 to inventory and reconcile in real-time. Once the check register or any positive match information is provided, the customer 30 expedites the check related credit postings and the check return process. This allows same day instant clearing and reconciliation on paid checks. Gift certificates and money orders may be treated in the same fashion as a check under the universal positive pay match, authentication, authorization, clearing and settlement system 10. The customer 30 uploads the creation of this real-time or at a specified time daily. The universal positive pay match, authentication, authorization, clearing and settlement system 10 will treat any fraud or ISF issues just like any other official item.

Through the universal positive pay match, authentication, authorization, clearing and settlement system 10, digitized, electronic and paper items will be cleared in the same fashion as clearing items similar to the Federal Reserve 80 or a third party check clearing house 70 or bank. The universal positive pay match, authentication, authorization, clearing and settlement system 10 provides the proper platform and protocol for clearing any items for both a positive match, an universal reverse pay match and creation of a negative file. The negative file is a file compiling credit history on the customer 30, along with his historical check writing behavior.

There are thousands of different types of accounting software packages being utilized by financial institutions, commercial accounts, retail establishments and merchants. The universal positive pay match, authentication, authorization, clearing and settlement system 10, universal reverse pay and universal negative pay systems can be provided commercially and will also be available by downloading from the Internet for a fee. These systems will be used by or connected to for personal use as well as commercial use by any entity desiring complete connectivity and accountability to a standardized form of accounting procedures that allow further security, easier connectivity and a standard protocol for all to enroll in.

It is to be understood that the present invention is not limited to the sole embodiments described above, but encompasses any and all embodiments within the scope of the following claims.

I claim:

1. A universal positive pay match, authentication, authorization, clearing and settlement system comprising:
   at least one server computer having a processor, an area of main memory, a storage device, and a bus connecting the processor, main memory, and the storage device;
   a database stored on said storage device;
   a data communications device connected to said bus for connecting said at least one server computer to an Internet; and web-based computer program code stored in said storage device and executing in said main memory under direction of said processor, the computer program code including:
  first instruction means for permitting a payer who executes a check for payment to enter and store check register information relating to the executed check in said database, the check register information including a check number, a date issued, a payee, a routing number, and an account number;
  second instruction means for providing a web site on the Internet accessible to the payer who executed the check, a payee of the executed check, a payee bank, a drawee bank, and banking institutions intermediate the payee bank and the drawee bank;
  third instruction means for enabling the payer who executed the check, the payee of the executed check, the payee bank, the drawee bank, and banking institutions intermediate the payee bank and the drawee bank to access check register information of the executed check at every point along a check clearing process in order to determine correspondence between check register information stored in said database and the executed check presented for payment; and
  fourth instruction means for enabling the payer who executed the check, the payee of the executed check, the payee bank, the drawee bank, and banking institutions intermediate the payee bank and the drawee bank to determine whether tampering or altering has occurred to the executed check at every point along a check clearing process;
  wherein said database stores check register information for payers who execute checks having accounted with a plurality of unrelated drawee banks.

2. The universal positive pay match, authentication, authorization, clearing and settlement system, according to claim 1, wherein said computer program code further comprises fifth instruction means for searching and capturing check register information for abandoned property subject to escheat.

3. The universal positive pay match, authentication, authorization, clearing and settlement system, according to claim 1, wherein said computer program code further comprises sixth instruction means for automatically polling check register information for storage on said database.

4. The universal positive pay match, authentication, authorization, clearing and settlement system, according to claim 1, wherein said computer program code further comprises seventh instruction means for performing a reconciliation of check registration information for payers who executed checks.

5. The universal positive pay match, authentication, authorization, clearing and settlement system, according to claim 1, wherein said computer program code further comprises eighth instruction means for locating lost, stolen, misplaced items and items not presented and that remain outstanding.

6. The universal positive pay match, authentication, authorization, clearing and settlement system, according to claim 1, wherein said computer program code further comprises ninth instruction means for archiving and storing check register, matching data, verification data and authentication data for up to a period of seven years.

7. The universal positive pay match, authentication, authorization, clearing and settlement system, according to claim 1, wherein said computer program code further comprises tenth instruction means for performing a debit stall and stalled debit procedure.

8. The universal positive pay match, authentication, authorization, clearing and settlement system, according to claim 1, wherein said first instruction means provides a web-based form transmitted to said database via the Internet.

9. The universal positive pay match, authentication, authorization, clearing and settlement system, according to claim 1, further comprising:
  (a) a telephone; and
  (b) means for demodulating check register information from a telephone carrier signal.

10. The universal positive pay match, authentication, authorization, clearing and settlement system, according to claim 1, further comprising:
  (a) a telephone; and
  (b) a voice recognition device coupled to said telephone and said database.

11. The universal positive pay match, authentication, authorization, clearing and settlement system, according to claim 1, further comprising plastic card financial instruments selected from a group consisting of credit cards, debit cards, stored value cards and smart cards.

12. The universal positive pay match, authentication, authorization, clearing and settlement system, according to claim 1, further comprising an optical character recognition device.

13. The universal positive pay match, authentication, authorization, clearing and settlement system, according to claim 1, further comprising a magnetic-ink character recognition device.

14. The universal positive pay match, authentication, authorization, clearing and settlement system, according to claim 1, further comprising a digital technology recognition system.

15. The universal positive pay match, authentication, authorization, clearing and settlement system, according to claim 1, further comprising a fingerprint recognition system.

16. The universal positive pay match, authentication, authorization, clearing and settlement system, according to claim 1, further comprising an iris recognition system.

17. The universal positive pay match, authentication, authorization, clearing and settlement system, according to claim 1, further comprising a recognition system based on DNA technology.

18. The universal positive pay match, authentication, authorization, clearing and settlement system, according to claim 1, further comprising a matrix technology recognition system.

19. The universal positive pay match, authentication, authorization, clearing and settlement system, according to claim 1, wherein said computer program code further comprises eleventh instruction means for making a credit history compilation for a payer who executes checks based upon check register information.

20. The universal positive pay match, authentication, authorization, clearing and settlement system, according to claim 1, wherein said computer program code further comprises twelfth instruction means for compiling a behavior matrix for payers who execute checks based upon check register information.

21. A computerized method for a universal positive pay match, authentication, authorization, clearing and settlement system, said method comprising:
  (a) providing a database;
  (b) storing check register information relating to a check executed by a payer for payment in said database, the check register information including a check number, a date issued, a payee, a routing number, an account number, and an amount;

(c) providing a web site on the Internet accessible to the payer who executed the check, a payee of the executed check, a payee bank, a drawee bank, and banking institutions intermediate the payee bank and the drawee bank;

(d) enabling the payer who executed the check, the payee of the executed check, the payee bank, the drawee bank, and banking institutions intermediate the payee bank and the drawee bank to access the check register information of the executed check stored in said database via the web site at every point along a check clearing process in order to determine correspondence between the check register information stored in said database and the executed check presented for payment; and (e) enabling the payer who executed the check, the payee of the executed check, the payee bank, the drawee bank, and banking institutions intermediate the payee bank and the drawee bank to determine whether tampering or altering has occurred to the executed check at every point along a check clearing process.

22. The computerized method according to claim 21, further comprising the step of receiving and storing check registration information for a payer who executes a check in said database daily.

23. The computerized method according to claim 21, further comprising the step of automatically polling a payer who executes a check daily in order to update check register information in said database daily.

24. The computerized method according to claim 21, further comprising the steps of:

(a) receiving a request from a payee to query a drawee bank as to whether a a payer has sufficient funds to cover a check executed by the payer that is listed in check register information stored in said database;

(b) querying the drawee bank as to whether a payer has sufficient funds to cover a check executed by the payer listed in check information register stored in said database;

(c) receiving a response to the query from the drawee bank; and (d) forwarding the response to the payee.

25. The universal positive pay match, authentication, authorization, clearing and settlement system, according to claim 1, wherein said computer program code further comprises thirteenth instruction means for authenticating, authorizing and clearing checks executed by payers at a point of purchase, at a point of encashment, and at a point of presentment.

26. The universal positive pay match, authentication, authorization, clearing and settlement system, according to claim 1, wherein said computer code further comprises fourteenth instruction means for enabling payers who execute checks to view their check register information in real-time.

* * * * *